United States Patent [19]

Lindner et al.

[11] 4,421,901

[45] Dec. 20, 1983

[54] RUBBER POWDERS

[75] Inventors: Christian Lindner, Cologne; Karl-Heinz Ott, Leverkusen, both of Fed. Rep. of Germany

[73] Assignee: Bayer Aktiengesellschaft, Leverkusen, Fed. Rep. of Germany

[21] Appl. No.: 337,010

[22] Filed: Jan. 4, 1982

[30] Foreign Application Priority Data

Jan. 13, 1981 [DE] Fed. Rep. of Germany ....... 3100714

[51] Int. Cl.$^3$ ............................................. C08F 265/04
[52] U.S. Cl. ..................................... 525/309; 524/458; 525/310; 525/902
[58] Field of Search ................. 523/201; 524/458, 460, 524/533, 534; 525/902, 309, 310

[56] References Cited

U.S. PATENT DOCUMENTS

| | | | |
|---|---|---|---|
| 3,787,522 | 1/1974 | Dickie | 525/902 |
| 3,833,682 | 9/1974 | Dickie | 525/309 |
| 3,959,408 | 5/1976 | Yusa | 525/902 |
| 3,985,703 | 10/1976 | Ferry | 523/201 |
| 4,026,970 | 5/1977 | Backderf | 525/902 |
| 4,082,895 | 4/1978 | Backderf et al. | 428/412 |
| 4,141,932 | 2/1979 | Butler | 260/880 |
| 4,205,019 | 5/1980 | Shima et al. | 525/243 |
| 4,247,434 | 1/1981 | Lovelace | 523/201 |
| 4,264,678 | 4/1981 | Nelsen | 525/902 |
| 4,265,939 | 5/1981 | Tebbens | 525/902 |

FOREIGN PATENT DOCUMENTS 2158835  6/1973  France .
2319655  2/1977  France .

*Primary Examiner*—Paul R. Michl
*Attorney, Agent, or Firm*—Connolly and Hutz

[57] ABSTRACT

Pourable rubber powders comprising particles having an average diameter of from 0.01 to 10 mm which contain, polymerized thereon, a shell of the polymer or copolymer of one or more vinyl monomers in a quantity of from 2 to 20% by weight, based on the rubber, and the core rubber is a latex polymer, the latex particles of which are composed of a core polymer and a sheath polymer, the core and sheath differing in their chemical composition and at least the sheath polymer being a diene or acrylate rubber having glass transition temperatures of below 0° C., and a process for the preparation of such rubber powders, wherein a latex of an approximate rubber is completely broken with the formation of an aqueous suspension of the rubber; from 2 to 20% by weight, based on the rubber, of one or more vinyl monomers which form polymers having glass transition temperatures of above 25° C. are then introduced into the suspension; and the monomer(s) is/are polymerized, optionally after adding a radical-forming catalyst.

3 Claims, No Drawings

RUBBER POWDERS

This invention relates to pourable rubber powders and to a process for the preparation thereof.

Rubber powders must be pourable to ensure that the polymers are worked in, compounded, processed, stored and handled easily. For example, synthetic rubbers which tend to stick together are powdered or covered with talcum, $TiO_2$ or $SiO_2$. However, these auxiliaries may have a detrimental effect on the properties of the polymers.

A process is described in German Offenlegungsschrift No. 2,801,817 to improve the handling properties of elastic graft rubbers by coagulating a vinyl polymer onto the surface of the rubber particles; the graft rubber particles are themselves also in a coagulated condition, but are not separated from the coagulant. This process requires a separate polymerisation stage for the vinyl polymer, and the ungrafted vinyl polymer changes the properties of the graft rubber.

A modified process is described in European Patent Specification No. 0,009,250; in this process, an organic solvent is used in addition to the vinyl polymer. This process has the same disadvantages and, moreover, the solvent has to be removed. If the known methods are applied to ungrafted rubbers, then polymer mixtures which have more disadvantageous substance properties are almost always produced.

It is also known from East German Patent Specification No. 86,500 to coagulate a rubber latex containing residual monomers and then to remove the remaining (and in this case, undesired) residual monomers by polymerisation. A pourable rubber powder is not obtained in this manner, because the polymerised residual monomers produce a polymer which is identical to the rubber.

It is known from German Offenlegungsschrift No. 2,843,068 to polymerize additional quantities of the monomers which form the graft casing in the presence of a suspension of an ABS graft copolymer.

The present invention provides a process for the preparation of pourable rubber powders comprising particles having an average diameter of from 0.01 mm to 10 mm, wherein a latex of a rubber, the latex particles of which are composed of a core polymer and a sheath polymer, the core and sheath differing from each other in their chemical composition, and at least the sheath polymer being a diene or acrylate rubber having glass transition temperatures of below 0° C., is completely broken with the formation of an aqueous suspension of the rubber; from 2 to 20% by weight, based on the rubber, of one or more vinyl monomers which form polymers having glass transition temperatures above 25° C. are then introduced into the suspension; and the monomer(s) is/are polymerised, optionally after adding a radical-forming catalyst.

The present invention also provides pourable rubber powders comprising particles having an average diameter of from 0.01 mm to 10 mm, preferably from 0.05 mm to 8 mm, and most preferably from 0.1 mm to 4 mm, which contain, polymerised thereon, a casing of the polymer or copolymer of one or more vinyl monomers in a quantity of from 2 to 20% by weight, based on the rubber, which are characterised in that the rubber is a latex polymer, the latex particles of which are composed of a core polymer and a sheath polymer, the core and sheath differing in their chemical composition and at least the sheath polymer being a diene or acrylate rubber having glass transition temperatures of below 0° C.

According to the present invention, all rubbers are suitable which are derived from dienes or acrylates, which are produced as an aqueous emulsion (latex) and the latex particles of which have a so-called core/sheath morphology, i.e. the latex particles of the rubbers derived from dienses of acrylates have an internal core which differs in its chemical or polymer-physical structure (composition) from the sheath which surrounds it, and at least the sheath polymer is a rubber which is derived from dienes or acrylates. The sheath and core polymers may be non-cross-linked, partly cross-linked or highly cross-linked, independently of each other.

Butadiene-(co)-polymers (with, for example, monomers such as styrene, acrylonitrile, vinyl ethers, acrylates and methacrylates), and aliphatic acrylate-(co)-polymers (acrylate rubbers) are particularly suitable as the sheath and/or core polymer.

Within the present context, acrylate rubbers are understood to be polymers or copolymers of $C_1$–$C_{12}$ alkyl acrylates, in particular methyl, ethyl, propyl, n-butyl or hexyl acrylate and polymers which are composed of at least 70% by weight of $C_1$–$C_{12}$ alkyl acrylate polymers. Styrene, acrylonitrile, alkyl methacrylate, butadiene, isoprene, vinyl ester, vinyl ether, vinyl carboxylic acid, allyl alcohol, allyl ester and allyl ether, for example, may function as comonomers for the $C_1$–$C_{12}$ alkyl acrylates. The acrylate rubbers may be partly or completely cross-linked, for example, by polyfunctional vinyl or allyl monomers.

Acrylate rubbers which are preferred are emulsion polymers which contain more than 60% by weight of gel and which have been cross-linked with polyfunctional and/or graft-cross-linking and/or graft-active monomers, for example, with triallyl (iso)-cyanurate, allyl (meth)acrylate and maleic acid allyl ester, etc. Acrylate rubbers of this type are known (see German Offenlegungsschrift Nos. 2,256,301; 2,558,476; German Auslegeschrift No. 2,624,656 and European Patent No. 0,001,782).

Within the present context, suitable core materials are polymers and copolymers which are derived, for example, from the following vinyl monomers and they do not necessarily need to have a rubber character: styrene, 2-phenylpropene, halogenated styrenes, (meth)acrylonitrile, methacrylic acid esters, acrylic acid or methacrylic acid, vinyl acetate, 1-olefins, such as ethylene, propylene, butene, dienes, alkyl acrylates, maleic acid derivatives and itaconic acid derivatives. Core/-sheath latex particles in the context of the present invention are also diene or acrylate rubbers which substantially consist of identical monomers but which, as the core polymer, contain a rubber which only differs from the rubber-like sheath polymer in its cross-linking nature, it cross-linking density or in other cross-linking features.

Rubber emulsion polymers of the type having different core/sheath structures are known.

The process according to the present invention may be carried out as follows:

A rubber latex having a core/sheath structure is initially prepared, this emulsion is then completely broken, for example, using electrolytes (such as acids and bases), by mechanical effects or by heating. Coagulation with aqueous solutions of acids and/or salts at temperatures of from approximately 30° to 100° C. is preferred. A heterogeneous suspension of discrete polymer particles differing in shape and size is obtained in water. The shape and size of the particles may be influenced by varying the precipitation conditions.

The vinyl monomer(s), such as styrene, acrylonitrile, alkyl methacrylate, acrylic acid, methacrylic acid, vinyl acetate and optionally regulators, radical initiators (in particular water-soluble persulphates) or antioxidants is/are then introduced into the vigorously agitated polymer suspension, preferably at temperatures of from approximately 30° to 100° C., and are polymerised radically; during this operation, the addition of suspending agents is unnecessary or is to be avoided. The polymer according to the invention is finally isolated, for example, by filtration or centrifugation, and is then dried.

The process according to the present invention may be carried out in batches, semi-continuously or completely continuously.

The polymer powders according to the present invention are stable in storage, pourable and non-tacky. They may be processed into, for example, elastomers, gum and highly-flexible plastics materials, etc., in a particularly simple and economic manner, for example, by melt compounding.

PRACTICAL EXAMPLES

1. Starting latices 1.1 The following emulsion is polymerised in a reactor with stirring at 65° C. over a period of approximately 22 hours until practically all the monomers have been converted:
- 100 parts by weight of butadiene,
- 1.8 parts by weight of Na-salt of disproportionated abietic acid,
- 0.257 parts by weight of sodium hydroxide,
- 0.3 parts by weight of n-dodecylmercaptan,
- 1.029 parts by weight of Na-ethylenediaminetetraacetate
- 0.023 parts by weight of potassium persulphate, and
- 760 parts by weight of water.

A latex is obtained which contains polybutadiene in a concentration of from 35 to 36% by weight.

1.2 The following are introduced for polymerisation:
- 90 parts by weight of water,
- 2.5 parts by weight of Na-sulphonate of $C_{14}$–$C_{18}$-hydrocarbons,
- 1.8 parts by weight of acrylonitrile,
- 4.8 parts by weight of styrene,
- 0.9 parts by weight of methyl methacrylate, and
- 0.00025 parts by weight of tert.-dodecylmercaptan.

The polymerisation process is started at a reaction temperature of from 63 to 65° C. using a solution consisting of the following:
- 15 parts by weight of water, and
- 0.3 parts by weight of potassium persulphate.

The following solutions are then metered regularly into the reactor over a period of 4.5 hours:

Solution 1:
- 9 parts by weight of methyl methacrylate,
- 65 parts by weight of styrene,
- 26 parts by weight of acrylonitrile, and
- 0.2 parts by weight of n-dodecylmercaptan.

Solution 2:
- 26 parts by weight of water, and
- 0.3 parts by weight of Na-sulphonate of $C_{14}$–$C_{18}$ hydrocarbons.

The mixture is then stirred for 4 hours at 63° C. A latex is obtained which contains the polymer in a concentration of 44% by weight.

2. Rubber latices which contain rubber particles having a core/sheath structure 2.1 The following mixture is introduced into a reactor with stirring at 65° C.:
- 200 parts by weight of latex 1.1,
- 5000 parts by weight of water,
- 14 parts by weight of potassium persulphate,
- 0.9124 parts by weight of triallyl cyanurate, and
- 399.09 parts by weight of n-butyl acrylate.

The following mixtures are metered separately into the reactor over a period of 5 hours at 63° C.:

Mixture A:
- 90 parts by weight of Na-sulphonate of $C_{14}$–$C_{18}$-hydrocarbons,
- 11900 parts by weight of water.

Mixture B:
- 23.09 parts by weight of triallyl cyanurate, and
- 10101 parts by weight of n-butyl acrylate.

The mixture is then left for 3 hours at 63° C. to polymerise completely. The polymers which have formed contain more than 85% by weight of gel, measured in dimethylformamide at 25° C. according to M. Hoffmann et al, Polymeranalytik I and II, Georg Thieme Verlag, Stuttgart 1977.

The polymer solids content of the latex is approximately 37.5% by weight.

2.2 Example 2.1 is repeated, but 175 parts by weight of latex 1.2 are used instead of latex 1.1.

2.3 The following emulsion is polymerised at from 60° to 68° C. over a period of approximately 110 hours:
- 100 parts by weight of butadiene,
- 20 parts by weight of latex 1.2,
- 80 parts by weight of water,
- 1.130 parts by weight of Na-salt of disproportionated abietic acid,
- 0.055 parts by weight of Na-salt of ethylenediaminetetraacetic acid,
- 0.137 parts by weight of sodium hydroxide,
- 0.028 parts by weight of sodium hydrogen carbonate, and
- 0.282 parts by weight of potassium persulphate.

A rubber latex is obtained which has a polymer solids content of from 53 to 54% by weight.

3. Preparation of some rubber powders according to the invention 3.1 The following are introduced into a reactor at 70° C.:
- 18800 parts by weight of water, and
- 245 parts by weight of magnesium sulphate ($MgSO_4 \cdot H_2O$).

The following quantity of latex is run into the reactor with stirring over a period of 2 hours:
- 11200 parts by weight of latex 2.1.

After the latex has been introduced, 466 parts by weight of methyl methacrylate are introduced regularly with stirring over a period of 1 hour. 5 parts by weight of potassium persulphate are then added with stirring. The suspension is then stirred for 3 hours at 90° C. The polymer is subsequently isolated.

3.2 Example 3.1 is repeated, but latex 2.2 is used instead of latex 2.1.

3.3 Example 3.1 is repeated, but a mixture of 130 parts by weight of acrylonitrile and 336 parts by weight of styrene is used instead of methyl methacrylate.

3.4 The following are introduced into a reactor at 70° C.:

22166 parts by weight of water, and 300 parts by weight of magnesium sulphate.

7838 parts by weight of latex 2.3 are run into the reactor with stirring over a period of 2 hours.

After the latex has been introduced, 466 parts by weight of methyl methacrylate are introduced regularly with stirring over a period of 1.5 hours. 6 parts by weight of potassium persulphate are then added. The suspension is then stirred for 3 hours. at 90° C. and the polymer is subsequently isolated.

4. Comparable powder and handling characterisation of the products 3

The polymer suspensions are worked up at room temperature by means of a laboratory centrifuge, the centrifugal chamber of which has an internal diameter of 30 cm and which operates at 1500 r.p.m.

The following procedure is carried out:

The polymer suspensions described in the above-mentioned Examples are introduced into the centrifuge in quantities such that 1 kg of solids, based on dry products, may be isolated per processing cycle. While the centrifuge is operating, the material is washed with water for 20 minutes in this manner, until the outflowing wash water is practically free of electrolytes. The material is then centrifuged dry for 5 minutes. The water content of this dry-spun material is then determined. The moist polymers are then dried for 24 hours at 70° C. on sheets in hot air driers.

The polymers thus produced are characterised with respect to pulverulence and adhesion.

| Polymer | Residual water content after centrifuging dry (% by weight) | Characterisation of dry polymers |
| --- | --- | --- |
| 3.1 | 34 | Pourable powder which does not agglomerate during storage |
| 3.2 | 29 | Pourable powder which does not agglomerate during storage |
| 3.3 | 32 | Pourable powder which does not agglomerate during storage |
| 3.4 | 28 | Pourable powder which does not agglomerate during storage |

As may be seen from the Table, the polymers 3 according to the invention are not only distinguished by advantageous residual water contents, but in particular also by specific powder properties, so that the technological usefulness of the rubbers in further processes is substantially more favourable.

We claim:

1. A process for the production of a pourable rubber powder comprising particles having an average diameter of from 0.01 to 10 mm, said process comprising completely breaking a latex of a rubber composed of a core polymer and a sheath polymer, the core and sheath differing from each other in their chemical composition and at least the sheath polymer being a diene or acrylate rubber having a glass transition temperature of below 0° C. so as to form an aqueous suspension of said rubber, then introducing into said aqueous suspension from 2 to 20% by weight, based on the rubber, of at least one vinyl monomer which forms a polymer having a glass transition temperature of above 25° C., and then polymerizing said vinyl monomer in the optional presence of a radical-forming catalyst.

2. The process of claim 1 wherein said diene or acrylate rubber is a homo- or co-polymer of butadiene, isoprene or chloroprene, or a homo- or co-polymer of at least one alkyl acrylate having rubber properties.

3. The process of claim 1 wherein said vinyl monomer is selected from the group consisting of styrene, acrylonitrile, alkyl methacrylate and mixtures thereof.

* * * * *